Jan. 2, 1934.  K. HEINEMANN  1,941,938
CONVEYING APPARATUS
Filed Jan. 21, 1931
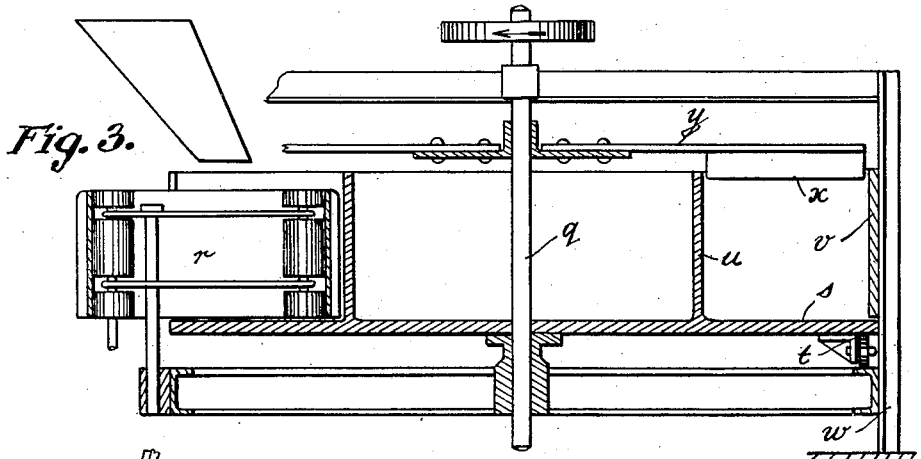
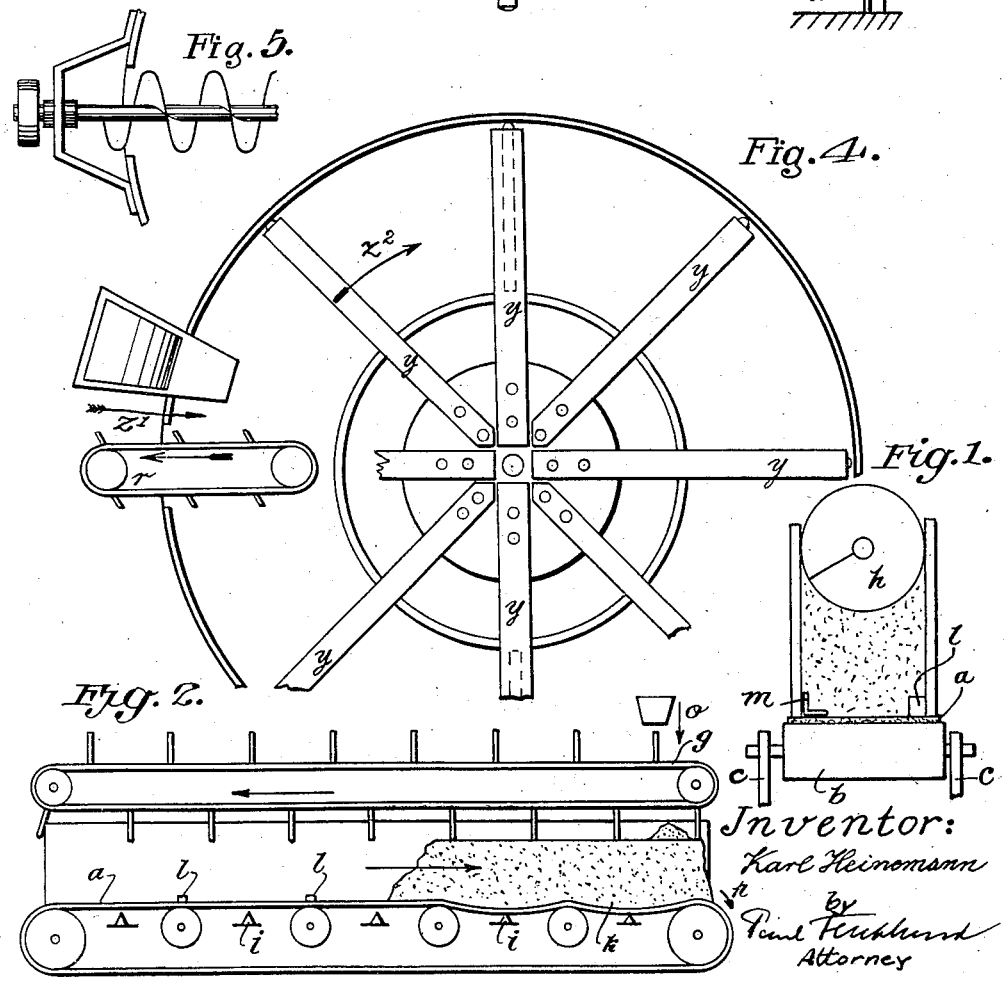

Patented Jan. 2, 1934

1,941,938

UNITED STATES PATENT OFFICE 1,941,938

CONVEYING APPARATUS

Karl Heinemann, Dresden, Germany

Application January 21, 1931, Serial No. 510,291, and in Germany February 28, 1930

8 Claims. (Cl. 198—161)

This invention relates to apparatus for conveying materials to one or more places where they are to be consumed. The object of the invention is to provide a conveyer by which a material is delivered at a constant rate. This object is attained by charging the conveyer, by hand or mechanically, with an excess of the material to be conveyed, and then removing the excess by means of a pattern carried over the material along a gauge, whereby the slope of the material is reduced to a uniform cross-section. Hereby a uniform and constant delivery is attained even if the supply from the storing-place is temporarily interrupted.

I am aware that several devices have been proposed for this purpose, such as feeding hoppers discharging the material upon a conveying belt or a scraping track, or into a helix or a cylinder provided with radially arranged cells; or elevators funnel-shaped at the bottom and scooping out of a pit &c. were used, but all these devices cannot fulfill the increased requirements of modern plants as to exactness and safety. They fail especially when ores, cellulose, wet salts or other wet materials liable to conglomerate, or unwieldly goods are to be treated.

These difficulties are avoided by an apparatus constructed according to the present invention by which even the most difficult materials can be dealt with safely and exactly.

The invention is illustrated, by way of example, in the annexed drawing of which Fig. 1 is a front view of a belt conveyer. Fig. 2 is a belt conveyer with the supply near the delivery end, a backwardly acting scraper, and a signalling device. Figs. 3 and 4 show, in cross-sectional elevation and in plan view respectively, a modification in which a circular conveyer is used. Fig. 5 is a detail view similar to Fig. 4 showing another form of the discharging device.

In all figures corresponding parts are marked by the same reference letters.

When it is desired not to remove the excess material laterally from the conveyer but to use it mainly for filling out voids in the charge, the sidewalls and the scraper may be suitably shaped, for instance, by arranging the scraper, or several of them in series, between side-walls so that they are countersunk in the material.

Referring now first to Fig. 1, $a$ is the conveyer belt, $b$ is one of the rolls supporting the belt, the roll being journaled in posts $c$. The loose material is confined between vertical side-walls between which a horizontal helix $h$ is arranged. By the action of the helix $h$ the excess of the material is conveyed backwards in a direction opposite the motion of the belt $a$. $l$ and $m$ are blocks or strips attached to the side walls to cover the slots caused by the sag of the belt between two adjacent rolls.

In the frequent case when the material is not conveyed by hand to the equalizing device, but by means of an elevator or the like, especially when the apparatus is to be placed directly at the point of consumption, but far from the storing-place (as well as in other cases), the modification shown in Fig. 2 may be employed. As the material here is put upon the conveyer only at one single point, viz. preferably at the delivery end, as shown by the arrow $o$, it must be be displaced in the length direction too, for instance, by a scraper $g$ or another suitable device. At the same time the material is uniformly distributed over the whole length. The material leaves the apparatus (Fig. 2) in the direction of the arrow $p$.

For securing the proper renewal of the stock on the equalizing device it is necessary to indicate the actual amount of the stock by signals, either at the stand of the apparatus itself or far from it, for instance, at the place where the above-mentioned feeding device is worked, or to control its operation by such signals. In Fig. 2 an example is given for means for releasing the signals. The sag produced by the weight of the material between each two supporting rolls is used for operating the feelers $i$. However this sag is disturbing with certain kinds of goods because of the slot $k$ formed between the belt and the side wall, which slot in many cases can be made harmless by providing wedge-shaped guard-blocks $l$ or by covering straps running along with the belt, or by shaping the side-walls (then stationary) to form bows at their lower edge, or by letting the belt run between and not under the side-walls. When a plate-conveyer is used instead of a belt conveyer, the slot varying in width does not at all exist. This element again may be adapted to the nature of the material, if desired, by means of a thin, not stretched ribbon running along with the conveying element to protect the latter against chemical attacks or to tighten the surface. When the conveyer is unyieldingly worked, there is no sag for operating the signal feelers $i$, but in this case there are other possibilities. For instance, bars or wires may be provided across the space for the material which are operated by the moving material, or magnetic or electric properties of the material, as conductivity, dielectric constant or the like may be utilized to operate the electric, hydraulic or mechanical signal feelers.

With very wide apparatus for big delivery and with certain materials the distribution over the breadth of the conveying element might possibly be unsatisfactory, if mechanical charging is employed. In such cases, for instance, the cross parts of the scraper (Fig. 2) are given a suitably curved or broken shape providing for lateral distribution.

Although in the foregoing description as well as in Figs. 1 and 2 a rectilinear movement of the conveyer is supposed, it is understood that my invention does not depend upon the form of the conveyer. For instance, a circular conveyer may be used as shown in Figs. 3, 4 and 5 which may even afford peculiar advantages in some special cases as far as the nature of the material to be conveyed and the shape or dimensions of the room are concerned where the conveyer is to be installed.

In Figs. 3 and 4 $s$ is a circular turntable rotatable about the shaft $q$ and supported, if desired, by rolls $t$ near its edge. A circular wall $u$ is integral with the platform $s$, whereas a stationary outer cylinder $v$ is secured to the framework $w$. Blades $x$ carried by the spider $y$ are rotated around the shaft $q$ between the circular walls $u$ and $v$ in opposite direction to the table $s$; the said blades may be guided, if desired, by the upper edges of the walls $u$ and $v$. The outer cylinder $v$ is interrupted for a certain distance to receive a discharging device $r$ which in Figs. 3 and 4 consists of a conveying belt provided with scraping boards. For the latter a radial helix or any other suitable device may be substituted as shown in Fig. 5.

The material to be conveyed is supplied to the table through a funnel at a point indicated by arrows $z'$ and is conveyed to the discharging devices ($r$ in Fig. 4) with a predetermined speed. The scraper $y$ uniformly wipes off the surface of the material to be conveyed to a certain level, thereby spreading the excess of material upon the table in a direction opposite to the motion of the latter. As long as an excess of material is supplied to the table, a stock augmenting in the direction of arrow $z^2$ is accumulated upon the table, of which stock the device $r$ in Fig. 4 or the helix in Fig. 5 discharges an always equal portion from the conveyer.

In the same manner as above described the degree of filling is indicated by signals which are operated by the material, which is piled up in the conveyer, by means of its motion, its weight or another property.

It is further possible with all the described modifications of the invention to control by the signals the place or point where the material is supplied to the conveyer in such a way that the material takes the shortest way upon the conveying element from the supply to the discharge.

Instead of using the discharging device $r$ a damming surface may be employed for discharging the material from the table, which surface extends in a straight or spiral line from the inner wall $u$ towards the circumference of the table, the outer enclosure $v$ being provided with a corresponding opening. Furthermore the material on the table may be discharged by comtposing the platform of the table of a series of portions which up to the discharging opening are guided in the plane of the table and then are flapped downwards, whereupon they are elevated into their normal horizontal position by means of a correspondingly shaped guidance on further movement of the table.

I claim:—

1. A conveyer comprising a circular movable element, an inner cylinder integral with said element, a stationary outer cylinder closely surrounding the said circular element a scraper moving in opposite direction to the said circular element, an opening in the outer cylinder at the delivery end, and means for discharging the conveyed material through the said opening.

2. A conveyer comprising a circular movable element, an inner cylinder integral with said element, a stationary outer cylinder closely surrounding the said circular element, a spider provided with scrapers coaxially moving in opposite direction to the said circular element, an opening in the outer cylinder at the delivery end, and means for discharging the conveyed material through the said opening.

3. A conveyer comprising a circular movable element, an inner cylinder integral with said element, a stationary outer cylinder closely surrounding the said circular element, a scraper moving in opposite direction to the said circular element, and being guided by the top edges of the said cylinders, and opening in the outer cylinder at the delivery end, and means for discharging the conveyed material through the said opening.

4. A conveyer comprising a circular movable element, an inner cylinder integral with said element, a stationary outer cylinder closely surrounding the said circular element, a scraper moving in opposite direction to the said circular element, an opening in the outer cylinder at the delivery end, and a helix radially penetrating the said opening.

5. A conveyer comprising a movable element adapted to be charged with the material to be conveyed, means for charging the material near the delivery end of the conveyer, and a conveying device acting in a direction parallel to and opposite the direction of and in certain distance above the said conveyer.

6. A conveyer comprising an endless belt extended between two rolls and moving in a certain direction, a series of rolls supporting the upper part of the belt, means for charging the belt with the material to be conveyed near one of its returning points, and a conveying device moving in a direction parallel to and opposite the direction of and in certain distance above the said endless belt.

7. A conveyer comprising a movable element adapted to be charged with the material to be conveyed, means for charging the material near the delivery end of the conveyer, a conveying device acting in a direction parallel to and opposite the direction of and in certain distance above the said conveyer, and a series of signals adapted to indicate the filling length of the conveyer.

8. A conveyer comprising an endless belt extended between two rolls and moving in a certain direction, a series of rolls supporting the upper part of the belt, means for charging the belt with the material to be conveyed near one of its returning points, a conveying device moving in a direction parallel to and opposite the direction of and in certain distance above the said endless belt, and a series of signals arranged under the upper part of the belt between the supporting rolls and actuated by the charged parts of the belt.

KARL HEINEMANN.